(12) United States Patent
Helmick (10) Patent No.: US 12,117,944 B2
(45) Date of Patent: Oct. 15, 2024

(54) SYSTEMS, METHODS, AND DEVICES FOR QUEUE MANAGEMENT WITH A COHERENT INTERFACE

(71) Applicant: Samsung Electronics Co., Ltd., Suwon-si (KR)

(72) Inventor: Daniel Lee Helmick, Broomfield, CO (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 17/712,066

(22) Filed: Apr. 1, 2022

(65) Prior Publication Data

US 2023/0236994 A1     Jul. 27, 2023

Related U.S. Application Data

(60) Provisional application No. 63/303,985, filed on Jan. 27, 2022.

(51) Int. Cl.
| | |
|---|---|
| *G06F 13/16* | (2006.01) |
| *G06F 3/06* | (2006.01) |
| *G06F 12/0831* | (2016.01) |

(52) U.S. Cl.
CPC ...... *G06F 13/1642* (2013.01); *G06F 13/1663* (2013.01); *G06F 13/1668* (2013.01)

(58) Field of Classification Search
CPC ............. G06F 13/1642; G06F 13/1663; G06F 13/1668

(Continued)

(56) References Cited

U.S. PATENT DOCUMENTS 10,235,102 B2    3/2019    Richter et al.
10,452,278 B2   10/2019    Benisty
(Continued)

FOREIGN PATENT DOCUMENTS

| EP | 3276481 A1 | 1/2018 |
|---|---|---|
| EP | 3462326 A1 | 4/2019 |

(Continued)

OTHER PUBLICATIONS

NVM Express, Inc., "NVMe@ over PCIe® Transport Specification, Revision 1.0," May 18, 2021, 37 pages.

(Continued)

*Primary Examiner* — Arpan P. Savla
*Assistant Examiner* — Sidney Li
(74) *Attorney, Agent, or Firm* — Renaissance IP Law Group LLP (57) ABSTRACT

A method may include accessing, by a first apparatus, a queue, wherein the queue may be accessible by a second apparatus, and the first apparatus may be connected to the second apparatus by a coherent interface, and indicating, by the coherent interface, to the second apparatus, the accessing. The indicating may include indicating by a monitoring mechanism. The indicating may include generating a monitoring request. The indicating may include generating, based on the monitoring request, an alert. The queue may include a submission queue. The queue may include a completion queue. The accessing may include reading an entry from the queue. The accessing may include writing an entry to the (Continued)

queue. The entry may include a command. The entry may include a completion. The first apparatus may include a host, and the second apparatus may include a device. The queue may be located at the host.

19 Claims, 5 Drawing Sheets

(58) Field of Classification Search
USPC .......................................................... 711/154
See application file for complete search history.

(56) References Cited

U.S. PATENT DOCUMENTS

| 10,997,093 | B2 | 5/2021 | Chang |
| 2003/0056032 | A1* | 3/2003 | Micalizzi, Jr. ........ G06F 13/126 |
| | | | 710/5 |
| 2014/0173149 | A1 | 6/2014 | Walker et al. |
| 2016/0070648 | A1 | 3/2016 | Wu |
| 2016/0217104 | A1* | 7/2016 | Kamble .................. G06F 3/067 |
| 2016/0350242 | A1 | 12/2016 | Lee |
| 2018/0260343 | A1* | 9/2018 | Park .................... G06F 13/1668 |
| 2019/0035445 | A1* | 1/2019 | Huang ................. G06F 12/0862 |
| 2019/0155760 | A1* | 5/2019 | Chang .................... G06F 3/0659 |
| 2021/0303459 | A1 | 9/2021 | Tai et al. |
| 2021/0374079 | A1* | 12/2021 | Shin ...................... G06F 13/382 |

FOREIGN PATENT DOCUMENTS

| EP | 3614253 A1 | 2/2020 |
| WO | 2021243340 A1 | 12/2021 |

OTHER PUBLICATIONS

Wang, David, "Compute Express Link™(CXL™) 2.0—Architecture and Benefits for Computational Storage," SNIA Persistent Memory + Summit 2021 Computational Storage, Apr. 21-22, 2021, 13 pages.

Das Sharma, Dr. Debendra et al., "Compute Express Link™ 2.0 White Paper," Compute Express Link, Mar. 2021, 4 pages.

European Extended Search Report for Application No. 23152879.5, mailed Jun. 12, 2023.

Sperling, Ed, "Choosing Between CCIX and CXL," Semiconductor Engineering, (https://semiengineering.com/choosing-the-appropriate-interconnect-protocol/), May 2020, 8 pages.

Sperling, Ed, "Which Chip Interconnect Protocol Is Better?," Semiconductor Engineering, (https://semiengineering.com/which-chip-interconnect-protocol-is-better/), May 2020, 9 pages.

* cited by examiner

SYSTEMS, METHODS, AND DEVICES FOR QUEUE MANAGEMENT WITH A COHERENT INTERFACE

REFERENCE TO RELATED APPLICATION

This application claims priority to, and the benefit of, U.S. Provisional Patent Application Ser. No. 63/303,985 titled "Systems, Methods, And Devices For Queue Handling For a Coherent Interface" filed Jan. 27, 2022 which is incorporated by reference.

TECHNICAL FIELD

This disclosure relates generally to queue management, and more specifically to systems, methods, and devices for queue management with a coherent interface.

BACKGROUND

A host and a device may communicate using a protocol that may use one or more queues. The host may write an entry such as a command to a submission queue. The host may also provide an indication to the device that the entry has been written to the submission queue. Based on receiving the indication, the device may fetch and process the entry from the submission queue. The device may also write an entry such as a completion to a completion queue. The host may fetch and process the entry from the completion queue.

The above information disclosed in this Background section is only for enhancement of understanding of the background of the inventive principles and therefore it may contain information that does not constitute prior art.

SUMMARY

A method may include accessing, by a first apparatus, a queue, wherein the queue may be accessible by a second apparatus, and the first apparatus may be connected to the second apparatus by a coherent interface, and indicating, by the coherent interface, to the second apparatus, the accessing. The indicating may include indicating by a monitoring mechanism. The indicating may include generating a monitoring request. The indicating may include generating, based on the monitoring request, an alert. The queue may include a submission queue. The queue may include a completion queue. The accessing may include reading an entry from the queue. The accessing may include writing an entry to the queue. The entry may include a command. The entry may include a completion. The first apparatus may include a host, and the second apparatus may include a device. The queue may be located at the host. The queue may be located at the device. The queue may be associated with a communication protocol. The communication protocol may include a storage protocol. The storage protocol may include a Nonvolatile Memory Express (NVMe) protocol. The coherent interface may include a Compute Express Link (CXL) interface.

A device may include a coherent interface, and a controller configured to communicate using a queue using the coherent interface, and receive an indication, by the coherent interface, of an access of the queue. The device may include a cache, and the coherent interface may be configured to maintain a coherency of at least a portion of the cache. The queue may be located at least partially in the cache. The device may include a shared local memory, and the coherent interface may be configured to maintain a coherency of at least a portion of the shared local memory. The queue may be located at least partially in the at least a portion of the shared local memory. The coherent interface may be configured to receive a monitoring request based on the access. The coherent interface may be configured to generate an alert based on the monitoring request. The controller may be configured to receive, from the coherent interface, the alert as the indication. The controller may be configured to process an entry in the queue based on the indication.

A system may include a host, and a device coupled to the host using a coherent interface, the device may include a controller configured to communicate, using a queue, with the host, using the coherent interface, and receive an indication, by the coherent interface, of an access, by the host, of the queue. The device may include a shared local memory, the coherent interface may be configured to maintain a coherency at least a portion of the shared local memory, and the queue may be located, at least partially, in the at least a portion of the shared local memory. The coherent interface may be a first coherent interface, the queue may be a first queue, the indication may be a first indication, the access may be a first access, and the host further may include a second coherent interface, wherein the host may be configured to communicate, using a second queue, with the device, using the second coherent interface, and receive a second indication, by the second coherent interface, of a second access, by the device, of the second queue. The device may include a shared local memory, the first coherent interface and the second coherent interface may be configured to maintain a coherency of at least a portion of the shared local memory. The second queue may be located at least partially in the at least a portion of the shared local memory.

BRIEF DESCRIPTION OF THE DRAWINGS

The figures are not necessarily drawn to scale and elements of similar structures or functions may generally be represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawings from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

DETAILED DESCRIPTION

A communication protocol may use one or more queues to exchange commands, completions, and/or the like, between components. For example, to read data from a device, a host may place a read command in a submission queue that may be accessible by the device. The host may also send an indication to the device to notify the device that the command is present in the submission queue. The device may fetch the read command from the submission queue and process the read command, for example, by sending the requested data to the host. The device may also place a completion in a completion queue to inform the host that the read command is completed.

In some aspects, the communication protocol may use an indication mechanism to indicate that an entry has been added to a queue. For example, in addition to placing a command in a submission queue, a host may write an entry to a register (which may be referred to as a doorbell register). Writing to the register may generate an interrupt that may notify the device that the command has been placed in the submission queue. However, such an indication mechanism may consume host and/or device resources, for example, to write the entry to the register (which may be located at the device), to service the interrupt, and/or the like.

A communication scheme in accordance with example embodiments of the disclosure may exploit a coherency mechanism of a coherent interface to perform one or more aspects of an indication function for an access of a queue. For example, a memory coherent interface may include a coherency mechanism that may notify one or more apparatus of a change to a coherent memory location. By implementing a queue with a coherent memory location, the coherency mechanism may notify one or more apparatus (e.g., a host, a device, and/or the like) that the queue has been accessed (e.g., written to and/or read from). Depending on the implementation details, this may reduce or eliminate the amount of resources used to indicate that the queue has been accessed. For example, depending on the implementation details, this may reduce or eliminate the use of a doorbell register, one or more processing operations, one or more interrupts, and/or the like.

In some embodiments, a coherency feature of a coherent interface may be used to implement an indication mechanism for a queue. For example, a coherent interface may implement a cache coherency protocol that may be used, for example, to provide a device with access to a portion of host memory. A copy of the portion of host memory may be stored in a cache memory at the device, and a cache coherency mechanism of the coherent interface may maintain coherency of the cache memory at the device and the portion of host memory. In some embodiments, the coherency mechanism may use a monitoring mechanism (e.g., a snooping mechanism) to determine that a memory location has been updated (e.g., at the host or the corresponding cache at the device). In such an embodiment, if a queue is implemented using a device cache memory, the monitoring mechanism may be used to indicate to the host and/or device that the queue has been accessed.

As another example, a coherent interface may implement a memory coherency protocol that may be used, for example, to provide a host with shared access to local memory at a device. A memory coherency mechanism of the coherent interface may maintain coherency of the shared device memory, for example, such that, if a shared memory location is updated by one of the host or the device, the other may be notified to prevent it from using out-of-date data. In such an embodiment, if a queue is implemented using a device shared memory, the memory coherency mechanism of the coherent interface may be used to indicate to the host and/or device that the queue has been accessed.

Alternatively, or additionally, a cache coherency mechanism and a memory coherency mechanism of a coherent interface may be used in combination to implement an indication mechanism for a queue. For example, a queue may be implemented in a device shared memory location using a memory coherency mechanism of the coherent interface. A cache coherency mechanism of the coherent interface may be used to monitor (e.g., by snooping) the queue in the device shared memory location to determine that the queue has been updated by a host and send an indication (e.g., an alert) to the device.

Figure 1:
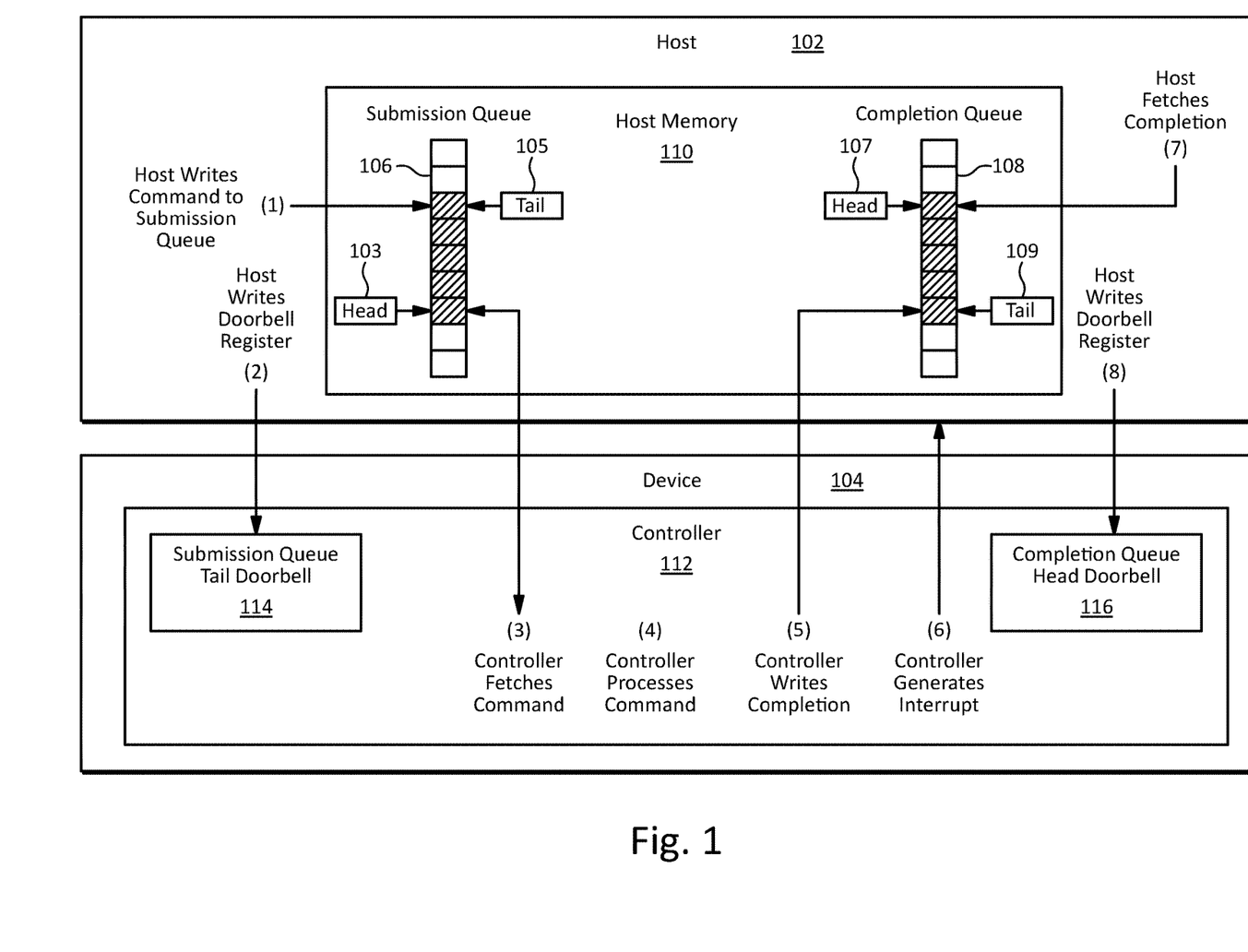
FIG. 1 illustrates an embodiment of a queue scheme for a communication protocol in accordance with example embodiments of the disclosure.

FIG. 1 illustrates an embodiment of a queue scheme for a communication protocol in accordance with example embodiments of the disclosure. The embodiment illustrated in FIG. 1 may be used, for example, with a storage protocol such as Nonvolatile Memory Express (NVMe) which may use an interconnect such as Peripheral Component Interconnect Express (PCIe) and/or the non-coherent input and/or output (I/O or IO) protocol of CXL which may be referred to as CXL.IO. As another example, the embodiment illustrated in FIG. 1 may be used with the NVMe-over-fabric (NVMe-oF) protocol which may use a network such as Ethernet, but the principles are not limited to these or any other implementation details. In some embodiments implemented with support for CXL, the CXL.IO protocol may essentially correspond to PCIe, whereas the CXL.mem and/or CXL.cache protocols may implement one or more additional features that may provide coherency.

The embodiment illustrated in FIG. 1 may include a host 102 and a device 104. The host 102 may include a submission queue (SQ) 106 and a completion queue (CQ) 108 located, for example, in host memory 110. In other embodiments, the submission queue 106 and/or the completion queue 108 may be located at the device 104 and/or any other location. The device 104 may include a controller 112 that may include a submission queue tail doorbell register 114 and/or a completion queue head doorbell register 116.

In some embodiments, the submission queue 106 and/or completion queue 108 may be used, for example, to enable the device 104 to receive and/or process one or more commands from the host 102. The submission queue 106 and/or completion queue 108 may be implemented, for example, as circular first-in-first-out (FIFO) queues in which one end of the queue may logically wrap around to the other end of the queue to enable entries to be added to, and removed from, the queue indefinitely (in some embodiments, subject to a maximum number of entries), even though the queue may be implemented with a finite linear address space. Referring to either the submission queue 106 or the completion queue 108, a slot with the oldest unfetched entry (e.g., command or completion) may be referred to as the head, and the next available unoccupied slot may be referred to as the tail. The head of the submission queue 106 may be pointed to by a head entry pointer 103 (which may also be referred to as a head pointer), and the tail of the submission queue 106 may be pointed to by a tail entry pointer 105 (which may also be referred to as a tail pointer). The head of the completion queue 108 may be pointed to by a head entry pointer 107, and the tail of the completion queue 108 may be pointed to by a tail entry pointer 109. When a queue is empty, the head entry pointer and the tail entry pointer may point to the same location.

An example embodiment of a method for receiving and/or processing one or more commands from the host 102 may proceed as follows.

At operation (1), the host 102 may place (e.g., write) one or more commands in one or more slots (e.g., one command per slot) in the submission queue 106 beginning at an empty slot pointed to by the tail entry pointer 105. The tail entry pointer 105 may then be updated to point to the next available slot in the submission queue 106.

At operation (2), the host 102 may also update (e.g., write to) the submission queue tail doorbell register (SQ-TDB) 114 to initiate a process that may notify the controller 112 that one or more new commands have been placed in the submission queue 106. For example, the host 102 may write a new value of the submission queue tail entry pointer 105 to the submission queue tail doorbell register 114.

In some embodiments, the submission queue tail doorbell register 114 may be monitored with hardware, software, or a combination thereof to provide an indication to the controller 112 that one or more new commands have been placed in the submission queue 106. For example, in some embodiments, the submission queue tail doorbell register 114 may be implemented as a hardware monitored register or memory location (e.g., location such as a PCIe location at the controller 112 and/or the device 104) that may generate an interrupt for the device 104 based on an update of the register 114. In some embodiments, an interrupt may serve as an indication to the controller 112 and/or the device 104 that one or more new commands have been placed in the submission queue 106.

In some embodiments, receiving an indication of one or more new commands being placed in the submission queue 106 may enable the controller 112 to track the number of unfetched and/or unprocessed commands that may be present in the submission queue 106. In some embodiments, this information may be used, for example, with a command arbitration process that may enable the controller 112 to determine which submission queue (if there are multiple submission queues) the controller 112 may fetch one or more commands from.

At operation (3), the controller 112 may fetch (e.g., by reading) one or more commands from the submission queue 106 beginning at a location pointed to by the head entry pointer 103. The head entry pointer 103 may be implemented, for example, using a memory location (e.g., a PCIe memory location) that may be accessible to the device 104. In some embodiments, the head entry pointer 103 may be established as part of an initialization process for the submission queue 106. The head entry pointer 103 may then be updated to point to the next (e.g., oldest) unfetched command in the submission queue 106.

In the embodiment illustrated in FIG. 1, the submission queue 106 may be a circular queue located at the host 102. Therefore, it may be beneficial for the host to track the location of the head of the submission queue 106, for example, for wrapping the submission queue 106 to prevent a collision between the head and the tail of the submission queue 106. In some embodiments, the head entry pointer 103 may be accessible to the host 102, and thus, the host 102 may read the head entry pointer 103 to track the location of the head of the submission queue 106. In some other embodiments, however, the host 102 may not have direct access to the head entry pointer 103 of the submission queue 1016. Thus, the scheme illustrated in FIG. 1 may implement a mechanism to enable the host 102 to track the location of the head of the submission queue 106. For example, in some embodiments, such a mechanism may be implemented essentially as a submission queue head doorbell register, for example, using a PCIe base address register. As another example, in some embodiments, such a mechanism may be implemented by the controller 104 sending the current value of the head entry pointer 103 to the host 102 in an entry (e.g., each entry) in the completion queue 108 which is described below.

At operation (4), the controller 112 may process one or more commands it has fetched from the submission queue 106. In some embodiments, the controller 112 may process one or more commands out of order. In some embodiments, fetching and/or processing may be referred to as consuming.

At operation (5), the controller 112 may place one or more completions corresponding to one or more processed commands in the completion queue 108 beginning at the next available slot which may be pointed to, for example, by the completion queue tail entry pointer 109. The completion queue tail entry pointer 109 may be updated to point to the next available slot in the completion queue 108. In some embodiments, a completion may include a phase tag that may be inverted from a previous entry, for example, to indicate to the host 102 that the completion queue entry (e.g., a new completion) is a new entry that is available for processing.

At operation (6), the controller 112 may generate an interrupt (e.g., a pin-based interrupt, a message signaled interrupt (MSI), an extended MSI interrupt (MSI-X), and/or the like) to indicate to the host 102 that one or more completions have been added to the completion queue 108. In some embodiments, one or more interrupts for one or more completions may be coalesced into a smaller number of interrupts.

At operation (7), the host 102 may fetch (e.g., by reading) one or more completions from the completion queue 108 beginning at the head which may be pointed to, for example, by the completion queue head entry pointer 107. In some embodiments, the host 102 may process one or more of the completions it has fetched from the completion queue 108. In some embodiments, the host 102 may continue fetching and/or processing completions, for example, until it encounters a completion with a phase tag that is inverted from a phase tag of a previously fetched completion.

At operation (8), the host 102 may update (e.g., write to) the submission queue head doorbell register (CQ-HDB) 116 to initiate a process that may notify the controller 112 that one or more completions have been removed (e.g., released from) the completion queue 108 (e.g., by reading the one or more completions from the completion queue 108). For example, the host 102 may write a new value of the completion queue head entry pointer 107 to the completion queue head doorbell register 116. In some embodiments, the host 102 may fetch and/or process one or more completions before updating the associated completion queue head doorbell register 116.

The methods and/or apparatus described with respect to FIG. 1 may enable a communication protocol using one or more queues to coordinate (e.g., keep in lock-step) the activities of the host 102 and the device 104. However, depending on the implementation details, the use of a scheme involving one or more doorbell registers may consume host and/or device resources, for example, for the host 102 to write the one or more entries to the one or more registers 114 and/or 116 (which may be located at the device 104), to service one or more interrupts, and/or the like.

For purposes of illustration, some embodiments may be described in the context of some specific implementation details. However, the principles are not limited to these or any other implementation details.

Figure 2:
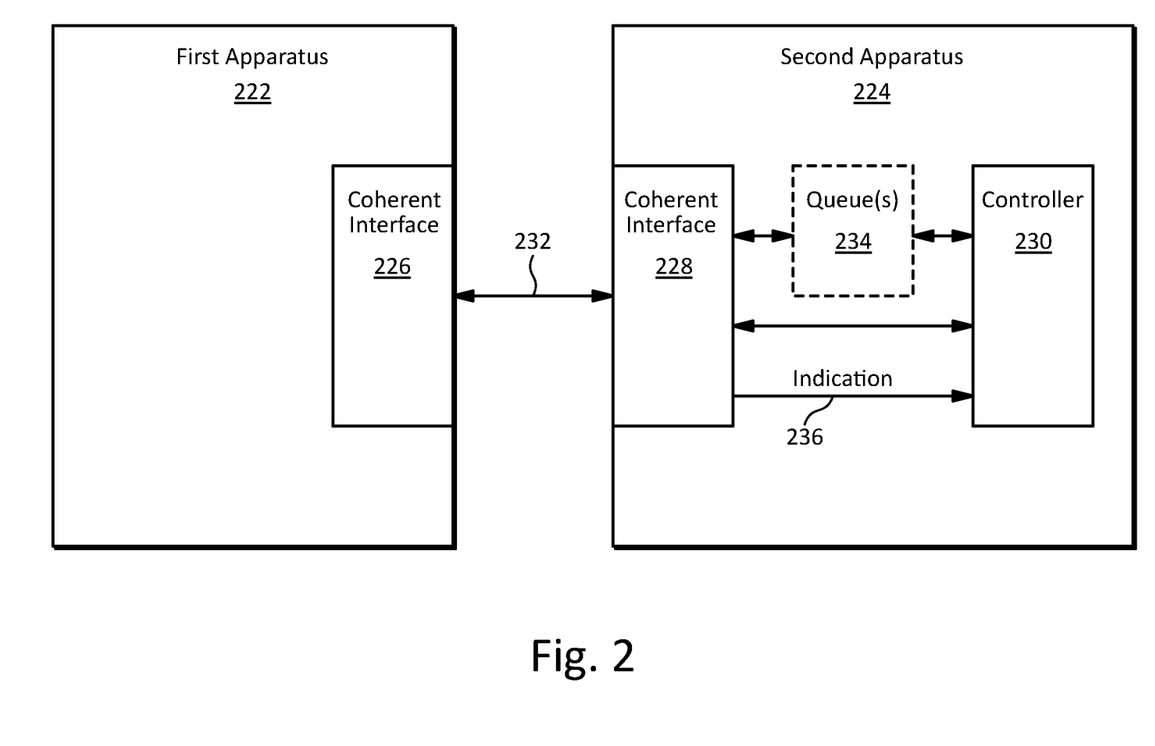
FIG. 2 illustrates an embodiment of a scheme for communicating using one or more queues and a coherent interface in accordance with example embodiments of the disclosure.

FIG. 2 illustrates an embodiment of a scheme for communicating using one or more queues and a coherent interface in accordance with example embodiments of the disclosure. The embodiment illustrated in FIG. 2 may include a first apparatus 222 and a second apparatus 224. The first apparatus 222 may include a first coherent interface 226. The second apparatus 224 may include a second coherent interface 228 and a controller 230. The first coherent interface 226 and the second coherent interface 228 may communicate through a communication connection 232. In some embodiments, the first apparatus 222 and/or the second apparatus 224 may be configured as a host, a client, a device, and/or the like, or any combination thereof. In some embodiments, the controller 230 may be a host controller, a client controller, device controller, and/or the like. In some embodiments, in addition to coherent messages, the first coherent interface 226 and/or the second coherent interface 228 may pass non-coherent messages. For example, in embodiments that implement support for CXL, the CXL.IO protocol may be used to pass non-coherent messages. Alternatively, or additionally, some embodiments may pass non-coherent messages, for example, using one or more interfaces (e.g., one or more interfaces with non-coherent messaging capabilities) in addition to the first coherent interface 226 and/or the second coherent interface 228.

The controller 230 may be used by the second apparatus 224 to communicate with the first apparatus 222 through the second coherent interface 228 using a communication protocol that may use one or more queues 234 for exchanging requests, commands, completions, and/or the like between the first apparatus 222 and the second apparatus 224. In some embodiments, one or more of the one or more queues 234 may be implemented, for example, with a circular first-in-first-out (FIFO) as described above with respect to FIG. 1. In some embodiments, one or more of the one or more queues 234 may be implemented with any other type of queue arrangement. For example, in some embodiments, the first apparatus 222 may be implemented with a host, the second apparatus 224 may be implemented with a device, and a queue 234 may be implemented with a memory location where the host may write an entry instructing the device to perform one or more operations. The device may detect (e.g., by the indication 236) the write by the host and perform the one or more operations instructed by the entry. The device may write back to the memory location to indicate to the host that at least a portion of the one or more operations are completed. In some embodiments, this memory location may be implemented in an atomic memory access environment that may maintain synchronization, for example, between a first central processing unit (CPU) and a second CPU, between a CPU and a graphics processing unit (GPU), between a CPU and an accelerator, and/or the like. In some embodiments, and depending on the implementation details, such a memory location may or may not be implemented with a model such as a FIFO, an SQ, a CQ, and/or the like.

The one or more queues 234 may be located at the second apparatus 224 as shown in dashed outline in FIG. 2. Additionally, or alternatively, the one or more queues 234 may be located at the first apparatus 222, may be located partially at the first apparatus 222 and partially at the second apparatus 224, or may be located at any other location or locations. In some embodiments, one or more of the one or more queues 234 may essentially be located at both the first apparatus 222 and the second apparatus 224, for example, if a queue 234 is implemented with a coherent cache at the second apparatus 224 that is configured to cache one or more locations of a memory at the first apparatus 222.

The second coherent interface 228 may provide an indication 236 to the controller 230 of an access by the first apparatus 222 of one or more of the one or more queues 234. In some embodiments, accessing a queue may refer to accessing an entry in a queue, a pointer to a location (e.g., an entry) in a queue, and/or the like. For example, in some embodiments, the indication 236 may indicate an access (e.g., a read and/or a write) of one or more memory locations that may be at least partially contained in, and/or point to a location in, one or more of the one or more queues 234. In some embodiments, and depending on the implementation details, the embodiment illustrated in FIG. 2 may exploit a coherency mechanism of the first coherent interface 226 and/or the second coherent interface 228 to provide the indication 236. For example, the first coherent interface 226 and/or the second coherent interface 228 may implement a coherency mechanism that may notify the first apparatus 222 and/or the second apparatus 224 of a change to one or more cache locations and/or shared coherent memory locations at the first apparatus 222 and/or the second apparatus 224. By implementing one or more of the one or more queues 234, and/or one or more pointers to one or more locations in a queue, with a coherent cache and/or a coherent memory location, the coherency mechanism may provide the indication 236 that one or more of the one or more queues 234, and/or one or more pointers to one or more locations in a queue, has been accessed by the first apparatus 222. Depending on the implementation details, this may reduce or eliminate the amount of resources used to provide the indication 236. For example, depending on the implementation details, this may reduce or eliminate the use of a doorbell register, one or more processing operations, one or more interrupts, and/or the like.

The first apparatus 222 and/or the second apparatus 224 may be implemented with any type of apparatus including a server such as a compute server, a storage server, a network server, and/or the like, a computer such as a workstation, a personal computer, a tablet, a smartphone, and/or the like, a device such as an accelerator device, a storage device, a network device, a memory expansion and/or buffer device, a GPU, a neural processing unit (NPU), a tensor processing unit (TPU), and/or the like, or any combination thereof.

The first coherent interface 226 and/or the second coherent interface 228 may be implemented with any type of coherent interface and/or coherency protocol such as Compute Express Link (CXL), and/or a coherent protocol such as CXL.mem, CXL.cache, CXL.IO, and/or the like, Gen-Z, Open Coherent Accelerator Processor Interface (OpenCAPI), Cache Coherent Interconnect for Accelerators (CCIX), and/or the like, or any combination thereof.

The controller 230 may implement any type of communication protocol that may use one or more queues including, for example, NVMe, NVMe-oF, PCIe, CXL.IO, Serial ATA (SATA), Small Computer Systems Interface (SCSI), Serial Attached SCSI (SAS), Direct Memory Access (DMA), Remote DMA (RDMA), RDMA over Converged Ethernet (ROCS), Advanced Message Queuing Protocol (AMQP), and/or the like, or any combination thereof.

The communication connection 232 may be implemented with any type of wired and/or wireless communication medium, interface, protocol, and/or the like including PCIe, CXL, Advanced eXtensible Interface (AXI), Ethernet, Transmission Control Protocol/Internet Protocol (TCP/IP), FibreChannel, InfiniBand, SATA, SCSI, SAS, iWARP, any generation of wireless network including 2G, 3G, 4G, 5G, and/or the like, any generation of Wi-Fi, Bluetooth, near-field communication (NFC), and/or the like, or any combination thereof. In some embodiments, the communication connection 232 may include a communication fabric including one or more links, buses, switches, hubs, nodes, routers, translators, repeaters, and/or the like. In some embodiments, the scheme illustrated in FIG. 2 may include one or more additional apparatus having one or more additional coherent interfaces connected using the communication connection 232 and/or an extension thereof. In some embodiments, the communication connection 232 may include a switch with memory that may be accessed by one or more hosts, devices, and/or the like. In some embodiments, the communication connection 232 may include one or more additional apparatus that may be configured as a peer (e.g., an equal peer) and which, in some embodiments, may include memory that may be accessible to one or more other apparatuses.

In an embodiment in which one or more of the first apparatus 222 and/or the second apparatus 224 is implemented as a storage device, the storage device may include any type of nonvolatile storage media based, for example, on solid state media (e.g., a solid state drive (SSD)), magnetic media (e.g., a hard disk drive (HDD)), optical media, and/or the like, or any combination thereof. For example, in some embodiments, a storage device may be implemented as an SSD based on not-AND (NAND) flash memory, persistent memory such as cross-gridded nonvolatile memory, memory with bulk resistance change, phase change memory (PCM), and/or the like, or any combination thereof. Any such storage device may be implemented in any form factor such as 3.5 inch, 2.5 inch, 1.8 inch, M.2, Enterprise and Data Center SSD Form Factor (EDSFF), NF1, and/or the like, using any connector configuration such as SATA, SCSI, SAS, U.2, M.2, and/or the like. Any such storage device may be implemented entirely or partially with, and/or used in connection with, a server chassis, server rack, dataroom, datacenter, edge datacenter, mobile edge datacenter, and/or any combinations thereof.

Figure 3:
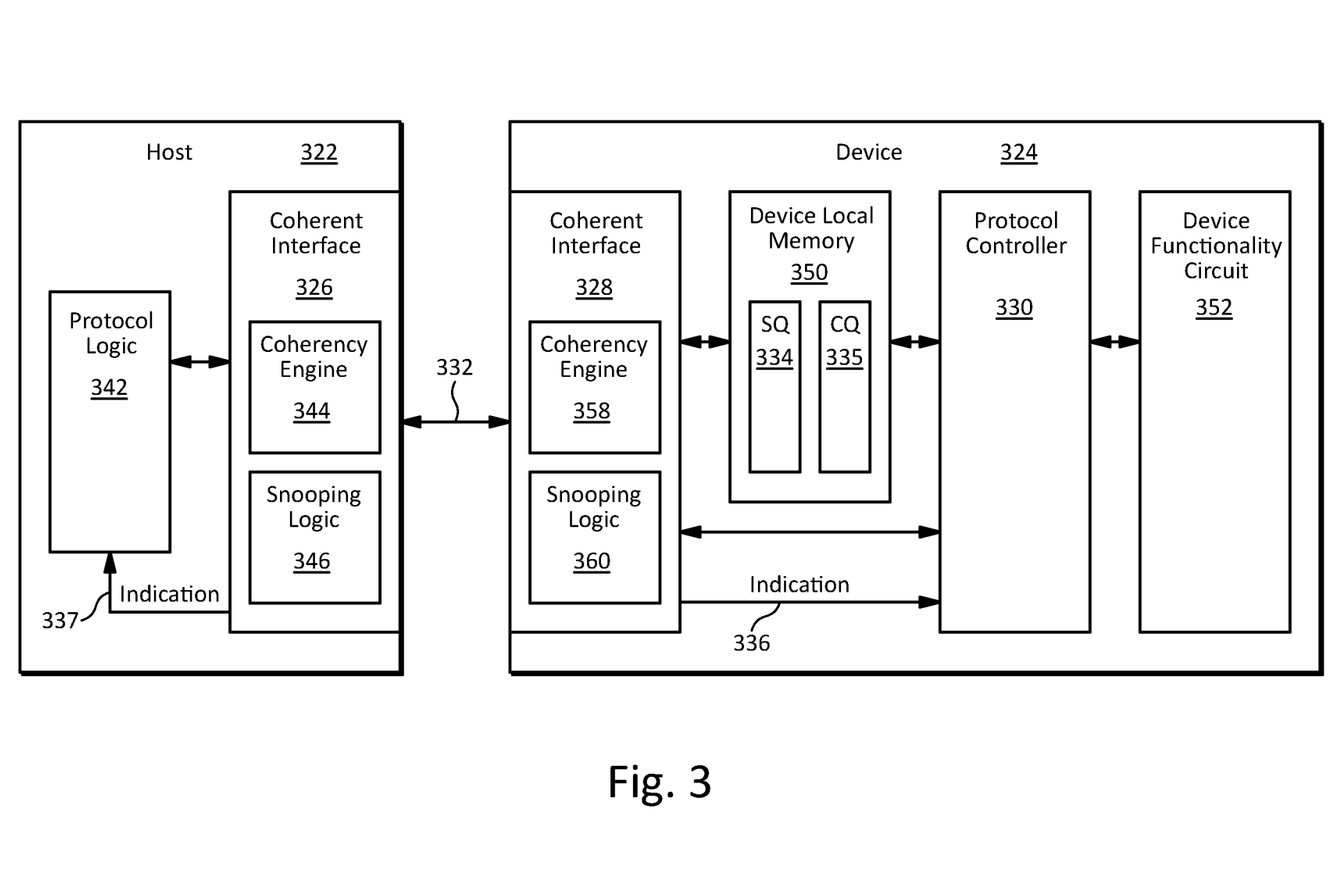
FIG. 3 illustrates an example embodiment of a system for communicating using one or more queues and a coherent interface in accordance with example embodiments of the disclosure.

FIG. 3 illustrates an example embodiment of a system for communicating using one or more queues and a coherent interface in accordance with example embodiments of the disclosure. The embodiment illustrated in FIG. 3 may be used, for example, to implement the scheme illustrated in FIG. 2. The embodiment illustrated in FIG. 3 may include a host 322 and a device 324 that may communicate using a communication connection 332.

The host 322 may be implemented, for example, with a server or any other apparatus. The host 322 may include a coherent interface 326 and/or protocol logic 342. The host 322 may use the coherent interface 326 to communicate with the device 324 through the communication connection 332.

The coherent interface 326 may include a coherency engine 344 and/or snooping logic 346 (which may also be referred to as monitoring logic). in some embodiments, the snooping logic 346 may be capable of detecting an access of a queue, for example, one or more modifications (e.g., writes) of one or more data memory locations and/or one or more reads of the one or more data memory locations. The coherent interface 326 may be implemented, for example, with CXL and/or one or more CXL protocols or any other coherent interface, coherent protocols, and/or the like. For example, in an embodiment in which the coherent interface 326 is implemented with CXL, the coherency engine 344 may be implemented with a CXL coherency engine (which may also be referred to as coherency logic). In some embodiments, the snooping logic 346 may be separate from and/or partially integrated with the coherency engine 344.

The protocol logic 342 may implement, for example, a storage protocol such as NVMe or any other communication protocol that may use one or more queues. For example, in an embodiment in which the protocol logic 342 implements an NVMe protocol, the protocol logic 342 may configure submission queue 334 and/or a completion queue 335 as described below. In some embodiments, the protocol logic 342 and/or protocol controller 330 may implement any other type of communication protocol that may involve the use of one or more queues. For example, a host may use one or more queues to assign one or more work lists to one or more graphics processing units (GPUs), field programmable gate arrays (FPGAs), accelerators, and/or the like. As another example, a host may use one or more queues to provide one or more lists of data transfers for one or more networking devices, communication devices, and/or the like.

The device 324 may include a coherent interface 328, a device local memory 350, a protocol controller 330, and/or a device functionality circuit 352. The device 324 may be implemented with any type of device including, for example, an accelerator device, a storage device, a network device, a memory expansion and/or buffer device, a GPU, a neural processing unit (NPU), a tensor processing unit (TPU), an FPGA, and/or the like, or any combination thereof such as a computational storage device.

The device functionality circuit 352 may include any apparatus that may enable the device 324 to perform its intended functionality. For example, if the device 324 is implemented as an accelerator, the device functionality circuit 352 may include one or more computational resources such as one or more processors (e.g., CPUs such as complex instruction set computer (CISC) processors such as x86 processors and/or reduced instruction set computer (RISC) processors such as RISC-V and/or ARM processors), application specific circuits (ASICs), FPGAs, and/or the like or any combination thereof. As another example, if the device 324 is implemented as a storage device, the device functionality circuit 352 may include one or more storage media, a storage device controller, a media translation layer (e.g., a flash translation layer (FTL)), and/or the like or any combination thereof.

The coherent interface 328 may include a coherency engine 358 and/or snooping logic 360 (which may also be referred to as monitoring logic). The coherent interface 328 may be implemented, for example, with CXL and/or one or more CXL protocols or any other coherent interface, coherent protocols, and/or the like. For example, in an embodiment in which the coherent interface 328 is implemented with CXL, the coherency engine 358 may be implemented with a CXL coherency engine (which may also be referred to as coherency logic). In some embodiments, the snooping logic 360 may be separate from and/or partially integrated with the coherency engine 358.

In some embodiments, all or a portion of the device local memory 350 may be maintained coherently by a memory coherency protocol. For example, in an embodiment in which the coherent interface 328 is implemented with CXL, the coherent interface 328 may use the CXL.mem protocol to maintain coherency of the device local memory 350 with the device 324 and/or the host 322.

Alternatively, or additionally, in some embodiments, all or a portion of the device local memory 350 may be maintained coherently by a cache coherency protocol. For example, in an embodiment in which the coherent interface 328 is implemented with CXL, the coherent interface 328 may use the CXL.cache protocol to maintain coherency of all or a portion of the device local memory 350 with the device 324 and/or the host 322.

Alternatively, or additionally, in some embodiments, a cache coherency mechanism and a memory coherency mechanism of a coherent interface may be used in combination to maintain all or a portion of the device local memory 350 coherently. For example, in an embodiment in which the coherent interface 328 is implemented with CXL, the coherent interface 328 may use the CXL.mem protocol to configure all or a portion of the device local memory 350 as coherent memory, and CXL.cache protocol to implement an indication mechanism for a queue that may be located in a coherent portion of the device local memory 350.

In some embodiments, the device local memory 350 may be configured with any number of queues. For example, in the embodiment illustrated in FIG. 3, the device local memory 350 may be configured with a submission queue 334 and/or a completion queue 335.

The protocol controller 330 may implement, for example, a storage protocol such as NVMe or any other communication protocol that may use one or more queues. For example, in an embodiment in which the protocol controller 330 implements NVMe, the submission queue 334 and/or the completion queue 335 may be configured as an NVMe submission queue and/or an NVMe completion queue, respectively.

In some embodiments, the coherent interface 328 may provide an indication 336 to the protocol controller 330 of an access by the host 322 of the submission queue 334 and/or the completion queue 335. For example, the embodiment illustrated in FIG. 3 may exploit the coherency engine 358 and/or the snooping logic 360 to provide an indication to the protocol controller 330 of a change to the submission queue 334 and/or the completion queue 335 as described in more detail below.

In some embodiments, the coherent interface 326 may provide an indication 337 to the protocol logic 342 at the host 322 of an access by the device 324 of the submission queue 334 and/or the completion queue 335. For example, the embodiment illustrated in FIG. 3 may exploit the coherency engine 344 and/or the snooping logic 346 to provide an indication to the protocol logic 342 of a change to the submission queue 334 and/or the completion queue 335 as described in more detail below.

In some embodiments, an access of the submission queue 334 and/or the completion queue 335 may involve an entry (e.g., a command) which may involve a transfer of data such as read data, write data, and/or the like. In some embodiments, such data may reside at least partially in the device local memory 350 (at least a portion of which may be maintained coherently as shared memory), in other device memory, in system memory (e.g., host memory at the host 322), or at any other location.

Figure 4:
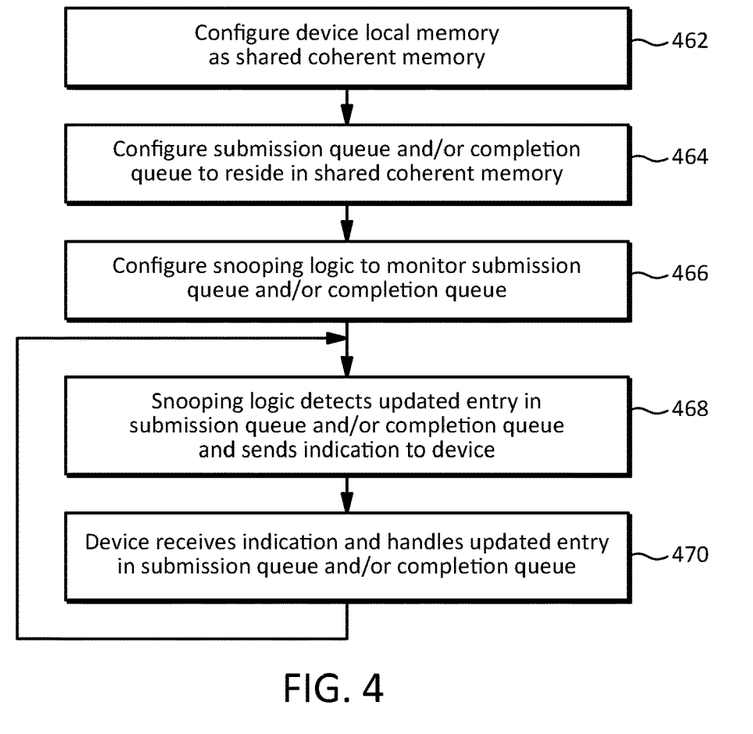
FIG. 4 illustrates an example embodiment of a method of communication using one or more queues and a coherent interface in accordance with example embodiments of the disclosure.

FIG. 4 illustrates an example embodiment of a method of communication using one or more queues and a coherent interface in accordance with example embodiments of the disclosure. The embodiment illustrated in FIG. 4 may be used, with the system illustrated in FIG. 3.

For purposes of illustration, the example embodiment illustrated in FIG. 3 may be described in conjunction with FIG. 4 and in the context of a system in which the coherent interfaces 326 and 328 may be implemented with CXL, and the protocol logic 342 and protocol controller 330 may be implemented with NVMe. However, the principles are not limited to these or any other implementation details.

Referring to FIG. 3 and FIG. 4, at operation 462, one or both of the coherency engines 344 and/or 358 may configure at least a portion of the device local memory 350 at the device 324 as shared coherent memory for access by the host 322, for example, using the CXL.mem protocol. In some embodiments, one or both of the coherency engines 344 and/or 358 may configure some or all of the shared memory to be monitored, for example, using the CXL.cache protocol to provide an indication to the host 322 and/or the device 324 when the submission queue 334 and/or the completion queue 335 is updated. Thus, in some embodiments, the submission queue 334 and/or the completion queue 335 may be configured in a shared portion of the device local memory 350 of the device 324 using the CXL.mem protocol, and the coherency mechanism of the CXL.cache protocol (e.g., coherency rules) may be applied to some or all of the memory locations at which the submission queue 334 and/or the completion queue 335 may be configured.

In some embodiments implemented with CXL, the coherency engines 344 and/or 358 may implement hardware-based coherency management, for example, using the CXL.cache host-to-device (H2D) and device-to-host (D2H) Request, Response, and Data channels to maintain coherency between the host 322 and the device 324. In other embodiments, cache coherence (e.g., cache consistency) may be maintained with hardware, software, or any combination thereof.

At operation 464, the submission queue 334 and/or the completion queue 335 may be configured to reside, at least partially, in the shared portion of the device local memory 350. For example, in an embodiment in which the protocol logic 342 and/or the protocol controller 330 are implemented with NVMe, the submission queue 334 and/or the completion queue 335 may be configured as an NVMe submission queue and/or an NVMe completion queue, respectively. In some embodiments, this arrangement may enable the host 322 to access the submission queue 334 and/or the completion queue 335 coherently as if it were part of the host memory, but with the coherency mechanism of the CXL.cache protocol configured to provide a snoop, and thus an alert (e.g., as the indication 336) as described below, to the protocol controller 330 when the host 322 updates one or more entries of the submission queue 334 and/or the completion queue 335. In some embodiments, the submission queue 334 and/or the completion queue 335 may be configured directly using CXL.cache.

At operation 466, the snooping logic 346 and/or 360 may be configured to monitor some or all of the submission queue 334 and/or the completion queue 335, for example, in the shared portion of the device local memory 350. For example, in some embodiments, the snooping logic 360 may be configured to monitor the submission queue 334 and provide an alert (e.g., as the indication 336) to the protocol controller 330 when the host 322 updates (e.g., writes) one or more entries of the submission queue 334. In some embodiments, an update by the host 322 of one or more entries of the submission queue 334 and/or the completion queue 335 may generate a snoop request by the host 322 to the device 324. In some embodiments, the coherency engine 358 and/or snooping logic 360 may be configured to generate an alert to the protocol controller 330 based on the snoop request.

At operation 468, the snooping logic 360 may determine that the host 322 has updated one or more entries of the submission queue 334 and/or the completion queue 335 and may send an alert to the protocol controller 330, for example, as the indication 336.

At operation 470, the protocol controller 330 may, based on receiving the alert, handle the update of the submission queue 334 and/or the completion queue 335. The method may then return to operation 468 to wait for the snooping logic 360 to detect another update of the submission queue 334 and/or the completion queue 335.

The embodiment illustrated in FIG. 4 may be described in the context of protocol controller 330 receiving an alert (e.g., as the indication 336) from the coherency interface 328 based on an access of a queue by the host 322. However, the method illustrated in FIG. 4 may be configured to operate in a similar manner to configure one or more snoops on the submission queue 334 and/or the completion queue 335 to provide an alert (e.g., as an indication 337) from the coherency interface 326 to the protocol logic 342 of the host 322 based on an access of the submission queue 334 and/or the completion queue 335 by the device 324.

Depending on the implementation details, the system and/or method described with respect to FIG. 4 and/or FIG. 3 may be used to implement a queue-based communication protocol similar to that illustrated in FIG. 1, but with the doorbell registers 114 and/or 116 and/or the accompanying interrupts and/or other resources replaced partially or completely by the coherency mechanism of the coherent interfaces 326 and/or 328. Thus, depending on the implementation details, the system and/or method described with respect to FIG. 4 and/or FIG. 3 may exploit the coherency mechanism of the coherent interfaces 326 and/or 328, reduce time, power consumption, operations, memory space, overhead, and/or the like, associated with the doorbell architecture illustrated in FIG. 1.

For example, referring to FIG. 1, in some embodiments using a coherency mechanism in accordance with the disclosure, operations (1) and/or (2) may be replaced, at least in part, by an operation in which the host may write a submission queue entry to a submission queue, which may be located, for example, in a device cache and/or a device memory location as illustrated in FIG. 3, and the coherency mechanism may provide the indication to the device (e.g., using a snoop and/or an alert) that the submission queue has been updated.

As another example, referring to FIG. 1, in some embodiments using a coherency mechanism in accordance with the disclosure, operations (5) and/or (6) may be replaced, at least in part, by an operation in which the device may write to a completion queue, which may be located, for example, in a device cache and/or a device memory location as illustrated in FIG. 3, and the coherency mechanism may provide the indication to the host (e.g., using a snoop and/or an alert) that the completion queue has been updated.

As a further example, referring to FIG. 1, in some embodiments using a coherency mechanism in accordance with the disclosure, any access (e.g., update) of any of the pointers 103, 105, 107, and/or 109 by a first apparatus (e.g., the host 102 and/or the device 104) may be indicated to another apparatus using a coherency mechanism, for example, as illustrated in FIG. 2, FIG. 3, and/or FIG. 4.

Referring again to FIG. 3, in some embodiments, a coherency mechanism of the coherent interfaces 326 and/or 328 may provide the indication 336 to enable the protocol controller 330 to determine that a queue has been updated at or near the time that the queue is updated. In some embodiments, the coherency mechanism of the coherent interfaces 326 and/or 328 may maintain the order of one or more queue updates for the protocol controller 330.

In some embodiments, when the protocol controller 330 fetches an entry from a queue, a coherency mechanism of the coherent interfaces 326 and/or 328 may provide an alert to the host 322, for example, to enable the host 322 to track the head of the queue (e.g., to reduce or prevent a queue overrun). Alternatively, or additionally, in some embodiments, the system illustrated in FIG. 3 may implement a submission queue head doorbell mechanism similar to that described above with respect to FIG. 1 to notify the host 322 when the protocol controller 330 fetches an entry from a queue.

In some embodiments, a memory space for one or more queues may be configured at a device, and a coherency protocol may be configured to monitor (e.g., snoop) some or all of the memory space to use a coherency mechanism of the coherency protocol to provide an indication to the device based on a host updating one or more entries of the one or more queues.

In some embodiments, a communication protocol (e.g., NVMe) may be configured to reduce or prevent partial updates to a queue. In some embodiments, a communication protocol (e.g., NVMe) may be configured to implement atomic updates. For example, in some embodiments, one or more entries of a queue may be updated simultaneously. Depending on the implementation details, this may reduce or prevent errors that may occur, for example, if a partial update to a queue triggers a snoop of a coherency mechanism and/or an associated alert, and a protocol controller reads the partial update before one or more entries is completely updated.

In some embodiments, a communication protocol (e.g., NVMe) may implement (e.g., define) a queue size (e.g., submission queue and/or completion queue) with wrapping to implement an update notification using a coherency mechanism of a coherent interface.

In some embodiments, a communication protocol (e.g., NVMe) may implement (e.g., define) one or more coherency settings (e.g., snoop settings, alert settings, and/or the like) on one or more queue memory addresses.

In some embodiments, an update of a queue entry (e.g., an addition of a submission queue entry by a host) may trigger activity in a device (e.g., a storage device such as an SSD).

In some embodiments, a host may be interrupted based on a snoop and/or an alert.

In some embodiments, when booting an apparatus (e.g., a host, device, and/or the like) the apparatus may announce one or more capabilities in accordance with example embodiments of the disclosure. For example, if an apparatus is implemented as an NVMe, apparatus, it may announce (e.g., using a configuration bit) that it is capable of using a coherency mechanism to indicate an update of a queue.

Any of the functionality described herein, including any of the host functionality, device functionally, and/or the like (e.g., the protocol logic 342, the controller 230, the protocol controller 330, the snoop logic 346 and/or 360, the coherency engine 344 and/or 358, and/or the like), may be implemented with hardware, software, firmware, or any combination thereof including, for example, hardware and/or software combinational logic, sequential logic, timers, counters, registers, state machines, volatile memories such as dynamic random access memory (DRAM) and/or static random access memory (SRAM), nonvolatile memory including flash memory, persistent memory such as cross-gridded nonvolatile memory, memory with bulk resistance change, phase change memory (PCM), and/or the like and/or any combination thereof, complex programmable logic devices (CPLDs), field programmable gate arrays (FPGAs), application specific integrated circuits (ASICs) CPUs including complex instruction set computer (CISC) processors such as x86 processors and/or reduced instruction set computer (RISC) processors such as ARM processors), graphics processing units (GPUs), neural processing units (NPUs), tensor processing units (TPUs) and/or the like, executing instructions stored in any type of memory. In some embodiments, one or more components may be Implemented as a system-on-chip (SOC).

Figure 5:
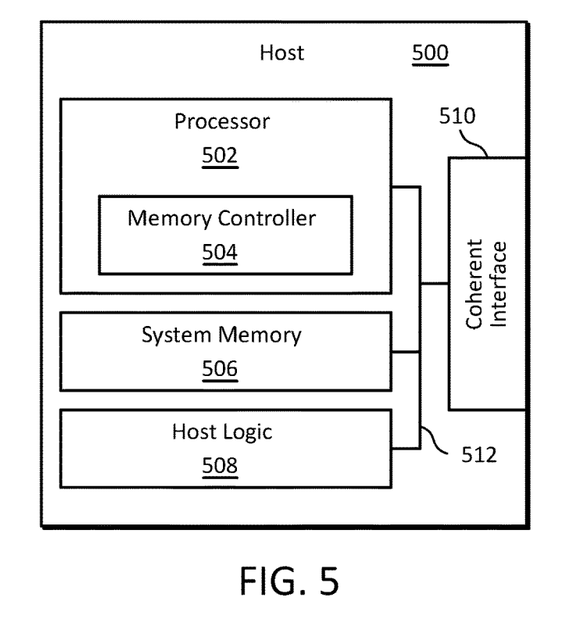
FIG. 5 illustrates an example embodiment of a host apparatus in accordance with example embodiments of the disclosure.

FIG. 5 illustrates an example embodiment of a host apparatus in accordance with example embodiments of the disclosure. The host apparatus 500 illustrated in FIG. 5 may be used, for example, to implement any of the hosts disclosed herein. The host apparatus 500 illustrated in FIG. 5 may include a processor 502, which may include a memory controller 504, a system memory 506, host logic 508, and/or a coherent interface 510. Any or all of the components illustrated in FIG. 5 may communicate through one or more system buses 512. In some embodiments, one or more of the components illustrated in FIG. 5 may be implemented using other components. For example, in some embodiments, the host control logic 508 may be implemented by the processor 502 executing instructions stored in the system memory 506 or other memory. In some embodiments, the host logic 508 may implement any of the host functionality disclosed herein including, for example, the protocol logic 342, reading and/or writing one or more queues, and/or the like.

Figure 6:
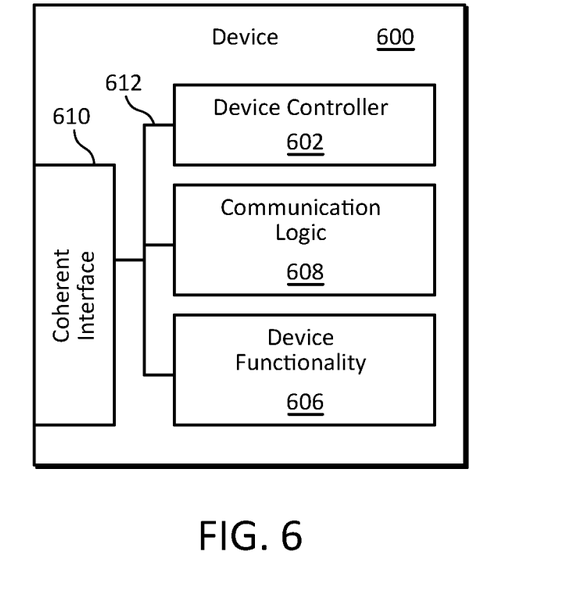
FIG. 6 illustrates an example embodiment of a device in accordance with example embodiments of the disclosure.

FIG. 6 illustrates an example embodiment of a device in accordance with example embodiments of the disclosure. The embodiment 600 illustrated in FIG. 6 may be used, for example, to implement any of the devices disclosed herein. The device 600 may include a device controller 602, communication logic 608, a device functionality circuit 606, and/or a coherent interface 610. The components illustrated in FIG. 6 may communicate through one or more device buses 612. The communication logic 608 may be used, for example, to implement the controller 230, the protocol controller 330, and/or the like.

The device functionality circuit 606 may include any hardware to implement the primary function of the device 600. For example, if the device 600 is implemented as a storage device, the device functionality circuit 606 may include a storage medium such as one or more flash memory devices, an FTL, and/or the like. As another example, if the device 600 is implemented as a network interface card (NIC), the device functionality circuit 606 may include one or more modems, network interfaces, physical layers (PHYs), medium access control layers (MACs), and/or the like. As a further example, if the device 600 is implemented as an accelerator, the device functionality circuit 606 may include one or more accelerator circuits, memory circuits, and/or the like.

Figure 7:
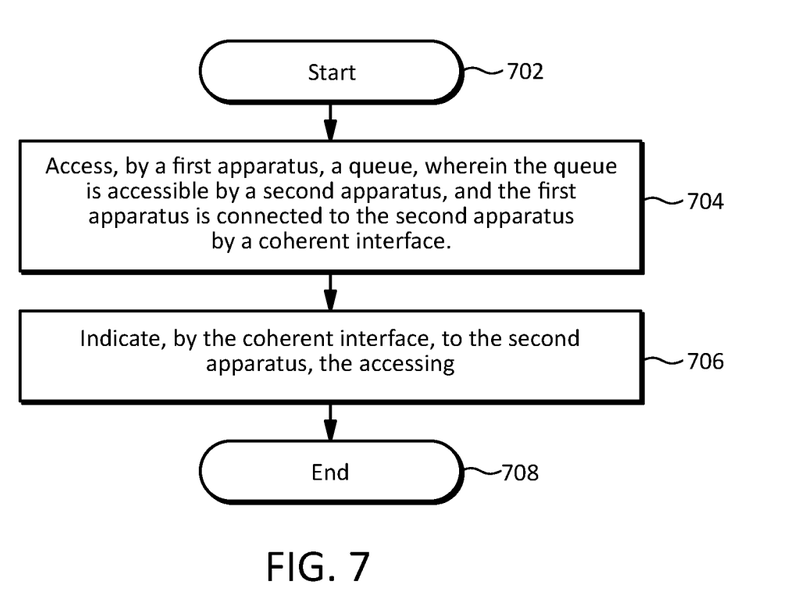
FIG. 7 illustrates an embodiment of a method for communication in accordance with example embodiments of the disclosure.

FIG. 7 illustrates an embodiment of a method for communication in accordance with example embodiments of the disclosure. The method may begin at operation 702. At operation 704, the method may access, by a first apparatus, a queue, wherein the queue is accessible by a second apparatus, and the first apparatus is connected to the second apparatus by a coherent interface. For example, in some embodiments, the first apparatus may be implemented as a host, the second apparatus may be implanted as a device, and the queue may be implemented as a submission queue for a communication protocol. At operation 706, the method may indicate, by the coherent interface, to the second apparatus, the accessing. For example, in some embodiments, the accessing may be implemented by a host placing an entry in a submission queue, and the indicating may be implemented by configuring the coherent interface to monitor (e.g., snoop) the submission queue and send an alert to the device. The method may end at operation 708.

The embodiment illustrated in FIG. 7, as well as all of the other embodiments described herein, are example operations and/or components. In some embodiments, some operations and/or components may be omitted and/or other operations and/or components may be included. Moreover, in some embodiments, the temporal and/or spatial order of the operations and/or components may be varied. Although some components and/or operations may be illustrated as individual components, in some embodiments, some components and/or operations shown separately may be integrated into single components and/or operations, and/or some components and/or operations shown as single components and/or operations may be implemented with multiple components and/or operations.

Some embodiments disclosed above have been described in the context of various Implementation details, but the principles of this disclosure are not limited to these or any other specific details. For example, some functionality has been described as being implemented by certain components, but in other embodiments, the functionality may be distributed between different systems and components in different locations and having various user interfaces. Certain embodiments have been described as having specific processes, operations, etc., but these terms also encompass embodiments in which a specific process, operation, etc. may be implemented with multiple processes, operations, etc., or in which multiple processes, operations, etc. may be integrated into a single process, step, etc. A reference to a component or element may refer to only a portion of the component or element. For example, a reference to a block may refer to the entire block or one or more subblocks. The use of terms such as "first" and "second" in this disclosure and the claims may only be for purposes of distinguishing the elements they modify and may not indicate any spatial or temporal order unless apparent otherwise from context. In some embodiments, a reference to an element may refer to at least a portion of the element, for example, "based on" may refer to "based at least in part on," and/or the like. A reference to a first element may not imply the existence of a second element. The principles disclosed herein have independent utility and may be embodied individually, and not every embodiment may utilize every principle. However, the principles may also be embodied in various combinations, some of which may amplify the benefits of the individual principles in a synergistic manner.

The various details and embodiments described above may be combined to produce additional embodiments according to the inventive principles of this patent disclosure. Since the inventive principles of this patent disclosure may be modified in arrangement and detail without departing from the inventive concepts, such changes and modifications are considered to fall within the scope of the following claims.

The invention claimed is:

1. A method comprising:
accessing, by a first apparatus, using a first protocol, a queue, wherein the queue is accessible by a second apparatus, and the first apparatus is connected to the second apparatus by a coherent interface; and
providing, by the coherent interface, using a second protocol, to the second apparatus, an indication of the accessing, by the first apparatus, using the first protocol, the queue;
wherein:
the first apparatus is configured to access the queue using the first protocol;
the second apparatus is configured to access the queue using the first protocol;
the queue is located in a memory location managed by the coherent interface; and
the coherent interface is configured to manage the memory location using the second protocol; and
wherein the coherent interface comprises monitoring logic configured to operate by:
detecting, by monitoring the queue, the accessing; and
generating, based on the detecting, the indication.

2. The method of claim 1, wherein the providing the indication comprises generating a monitoring request.

3. The method of claim 2, wherein the providing the indication comprises generating, based on the monitoring request, an alert.

4. The method of claim 1, wherein the queue comprises a submission queue.

5. The method of claim 1, wherein the accessing comprises reading an entry from the queue.

6. The method of claim 1, wherein the accessing comprises writing an entry to the queue.

7. The method of claim 6, wherein the entry comprises a command.

8. The method of claim 6, wherein the entry comprises a completion.

9. The method of claim 1, wherein:
the first apparatus comprises a host;
the second apparatus comprises a device; and
the queue is located at the device.

10. The method of claim 1, wherein the queue comprises a submission queue.

11. The method of claim 10, wherein the first protocol comprises a storage protocol.

12. A device comprising:
a coherent interface; and
at least one control circuit configured to:
communicate using a queue using a first protocol; and
receive an indication, by the coherent interface, using a second protocol, of an access of the queue, wherein the access of the queue is performed using the first protocol;
wherein:
the queue is located in a memory location managed by the coherent interface; and
the coherent interface is configured to manage the memory location using the second protocol; and
wherein the coherent interface comprises monitoring logic configured to operate by:
detecting, by monitoring the queue, the access; and
generating, based on the detecting, the indication.

13. The device of claim 12, wherein:
the device comprises a shared local memory; and
the coherent interface is configured to maintain a coherency of at least a portion of the shared local memory.

14. The device of claim 13, wherein the queue is located at least partially in the at least a portion of the shared local memory.

15. The device of claim 12, wherein the coherent interface is configured to receive a monitoring request based on the access.

16. The device of claim 15, wherein the coherent interface is configured to generate an alert based on the monitoring request.

17. The device of claim 16, wherein the controller is configured to receive, from the coherent interface, the alert as the indication.

18. A system comprising:
a host; and
a device coupled to the host using a coherent interface, the device comprising at least one control circuit configured to:
communicate, using a queue, with the host, using a first protocol; and
receive an indication, by the coherent interface, using a second protocol, of an access, by the host, using the first protocol, of the queue;
wherein:
the queue is located in a memory location managed by the coherent interface; and
the coherent interface is configured to manage the memory location using a second protocol; and
wherein the coherent interface comprises monitoring logic configured to operate by:
detecting, by monitoring the queue, the access; and
generating, based on the detecting, the indication.

19. The system of claim 18, wherein:
the device comprises a shared local memory;
the coherent interface is configured to maintain a coherency at least a portion of the shared local memory; and
the queue is located, at least partially, in the at least a portion of the shared local memory.

* * * * *